United States Patent
He et al.

(10) Patent No.: US 9,833,762 B2
(45) Date of Patent: Dec. 5, 2017

(54) ETHYLENE CRACKING FURNACE (75) Inventors: Xiou He, Beijing (CN); Jingkun Liu, Beijing (CN); Changli Li, Beijing (CN); Hainü Shen, Beijing (CN); Yuping Guo, Beijing (CN); Chen Shao, Beijing (CN)

(73) Assignees: China Petroleum & Chemical Corporation, Beijing (CN); SINOPEC Engineering Incorporation, Beijing (CN)

( * ) Notice: Subject to any disclaimer, the term of this patent is extended or adjusted under 35 U.S.C. 154(b) by 689 days.

(21) Appl. No.: 13/271,497

(22) Filed: Oct. 12, 2011

(65) Prior Publication Data
US 2013/0095443 A1 Apr. 18, 2013

(51) Int. Cl.
| F27B 5/14 | (2006.01) |
| B01J 19/00 | (2006.01) |
| C10G 9/20 | (2006.01) |
| B01J 19/24 | (2006.01) |
| B01J 6/00 | (2006.01) |

(52) U.S. Cl.
CPC ............ *B01J 19/006* (2013.01); *B01J 6/008* (2013.01); *B01J 19/244* (2013.01); *C10G 9/20* (2013.01); *B01J 2219/00157* (2013.01); *B01J 2219/00772* (2013.01); *C10G 2400/20* (2013.01)

(58) Field of Classification Search
CPC ................ F27B 5/14; C10G 9/20; C10G 9/00
USPC ........................ 432/209, 248, 249; 126/91 R
See application file for complete search history.

(56) References Cited

U.S. PATENT DOCUMENTS

| 1,887,155 A | * | 11/1932 | Harnsberger | 196/110 |
| 4,467,779 A | * | 8/1984 | Kreinin et al. | 126/91 A |
| 4,817,672 A | * | 4/1989 | Broodman | 138/113 |
| 4,850,334 A | * | 7/1989 | Cassagne et al. | 126/91 R |
| 2009/0252660 A1 | * | 10/2009 | Olver et al. | 422/197 |

FOREIGN PATENT DOCUMENTS

| CN | 1260469 | 7/2000 |
| CN | 101062881 | 10/2007 |
| CN | 101062884 | 10/2007 |
| CN | 201276508 | 7/2009 |
| CN | 101575255 | 11/2009 |
| WO | WO 99/13977 | 3/1999 |

OTHER PUBLICATIONS

English-language Abstract of CN 1260469 dated Jul. 19, 2000.
English-language Abstract of CN 101575255 dated Nov. 11, 2009.

* cited by examiner

Primary Examiner — Alissa Tompkins
Assistant Examiner — John Bargero
(74) Attorney, Agent, or Firm — Finnegan, Henderson, Farabow, Garrett and Dunner (57) ABSTRACT

An ethylene cracking furnace is provided. The ethylene cracking furnace includes at least one radiant section. The at least one radiant section includes bottom burners and/or sidewall burners, and at least one radiant coil arranged in the radiant section. The radiant coil includes at least an upstream pass tube and a downstream pass tube, the upstream pass tube being configured as an inner tube, and the downstream pass tube being configured as an outer tube surrounding the inner tube and having a closed end. The inner tube defines an inner space forming an upstream flow path. A gap defined between the inner tube and the outer tube forms an downstream flow path.

9 Claims, 8 Drawing Sheets

ETHYLENE CRACKING FURNACE

TECHNICAL FIELD

The disclosure relates to an ethylene cracking furnace for use in the petrochemical field, and more specifically to the structure of a radiant coil of an ethylene cracking furnace for use in the petrochemical industry.

BACKGROUND

Ethylene cracking technologies used in ethylene plants mainly include those developed by LUMMUS Co. (USA), Stone & Webster Co. (USA), Kellog & Braun Root Co. (USA), Linde Co. (Germany), and Technip KTI Co. (France/Netherlands), and CBL cracking furnace technology developed by China Petroleum & Chemical Corporation.

Figure 1:
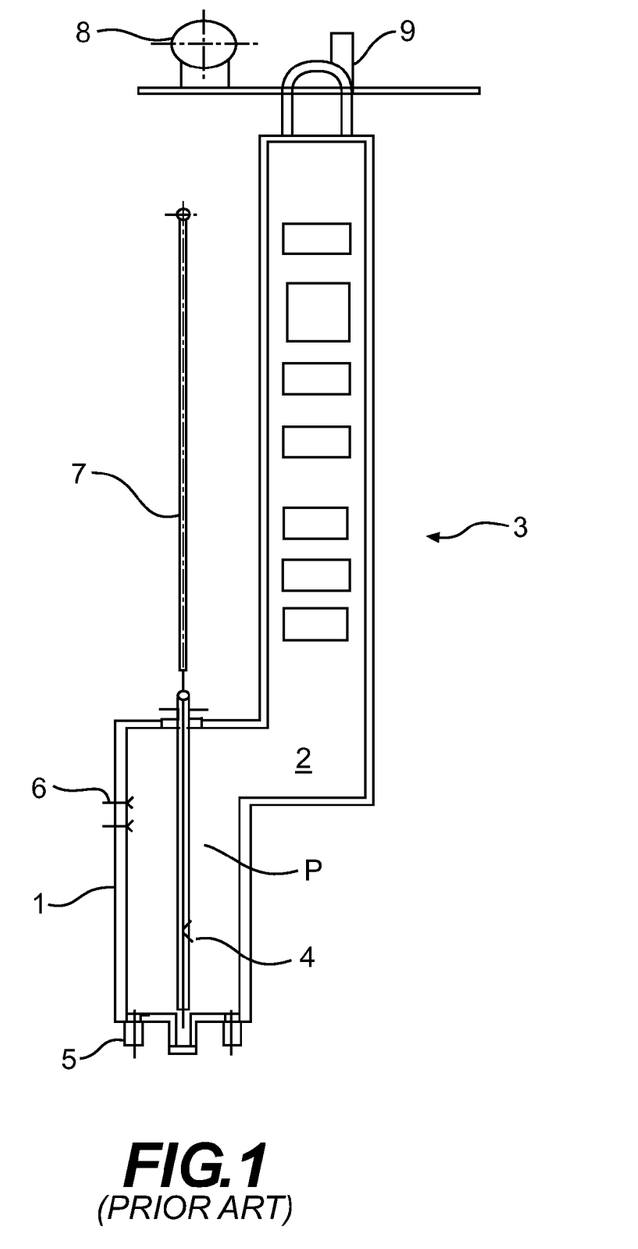
FIG. 1 is a pictorial illustration of an ethylene cracking furnace according to the prior art.

FIG. 1 shows a prior art ethylene cracking furnace, which includes a radiant section 1, a convection section 3, and a flue section 2 located between the radiant section 1 and the convection section 3. Within radiant section 1, a radiant coil 4 is arranged in the central plane P of radiant section 1 along the longitudinal direction thereof. In addition, radiant section 1 is further provided with bottom burners 5 and/or side burners 6 for firing. Moreover, the ethylene cracking furnace further includes transfer line exchanger(s) 7, a high-pressure steam drum 8 and an induced draft fan 9.

The radiant coil 4 generally may have a single-pass, two-pass or multi-pass structure. Among these structures, the single-pass radiant coil has the best cracking selectivity since it has the largest specific surface area, the shortest resident time, the highest cracking temperature, and a quick temperature increase. However, the single-pass radiant coil suffers from a large coking speed and a short run length. Moreover, since the outlet end of the single-pass radiant coil is directly connected to the transfer line exchanger's inlet, the radiant coil has to expand downwardly. The resulting thermal stress is difficult to overcome.

To significantly reduce feedstock consumption, maintain a suitable run length, and have a good feedstock flexibility, two-pass radiant coils having two pass tubes are used for liquid feedstock in most cracking furnace technologies. The first pass tube may have a small diameter. Therefore, a quick temperature increase can be achieved through the relatively large specific surface area of the small-diameter tube. The second pass tube may have a large diameter which reduces the influence on coking sensitivity. However, with respect to the two-pass radiant coil, the tube wall temperature of the first-pass tube is different from that of the second-pass tube, and therefore the thermal stress generated in the two pass tubes are different from each other. Consequently, the lifetime of radiant coils in two pass radiant coils are easily shortened. Multi-pass radiant coils are used for gas feedstock in most cracking furnace technologies. However, the tube wall temperature in a one pass tube is different from that in other pass tubes. Thermal stress generated in different pass tubes of multi-pass radiant coils are different from each other. Consequently, the lifetime of radiant coils will be also easily shortened. Additionally, two-pass or multi-pass radiant coils, including a plurality of tubes occupy a relatively large space in the furnace, requiring an increased size of the cracking furnace.

CN101575255A discloses a single-pass radiant coil including an inner tube and an outer tube, wherein feedstock flows along an annular gap formed between the inner tube and the outer tube. However, there is still a problem of a thermal expansion difference between the inner and outer tubes. Therefore, this kind of radiant coil has a poor mechanical property, and no significant process improvements compared with conventional single-pass radiant coils. Moreover, the cost for the single-pass radiant coil disclosed in CN101575255A is substantially high.

SUMMARY OF THE INVENTION

The present disclosure aims to provide an ethylene cracking furnace which may address one or more of the above-mentioned defects in current furnace technologies. The cracking furnace may include a radiant coil that may overcome the defects of thermal expansion stress and connection problems existing in two-pass or multi-pass radiant coils. The cracking furnace may also overcome short run-length and thermal expansion absorption difficulties existing in single-pass radiant coils.

According to the disclosure, an ethylene cracking furnace is provided. The ethylene cracking furnace may include at least one radiant section. The at least one radiant section may include bottom burners and/or sidewall burners, and at least one radiant coil arranged in the radiant section. The radiant coil may include at least an upstream pass tube and a downstream pass tube, the upstream pass tube being configured as an inner tube, and the downstream pass tube being configured as an outer tube surrounding the inner tube and having a closed end. The inner tube may define an inner space forming an upstream flow path. A gap defined between the inner tube and the outer tube may form a downstream flow path.

In some exemplary embodiments, the radiant coil may be a two-pass tube, in which the inner tube may form a first pass tube while a gap between the inner tube and an outer tube may form a second pass tube. However, it should be noted that the radiant coil can alternatively be a multi-pass coil, in which any two of adjacent pass tubes can adopt the inner/outer tube structure according to the disclosure. Further, it should be noted that the radiant coil can be arranged along the longitudinal direction or the lateral direction of the radiant section.

In some exemplary embodiments, in the transverse cross section of the radiant coil, a ratio of an area of the gap defined between the inner tube and the outer tube of the radiant coil to an area of the space of the inner tube may be in a range of 1-2:1. The ratio may also be in a range of 1.0-1.6:1, or 1.0-1.3:1.

In some exemplary embodiments, positioning elements may be arranged on the outer peripheral surface of the inner tube, the positioning elements maintaining coaxiality between the inner tube and the outer tube. Positioning elements may be wedge-shaped ribs substantially evenly distributed along the outer peripheral surface of the inner tube The wedge-shaped ribs may extend outwardly along the radial direction and may have a gradually narrow width. Alternatively, the position element may be divided into several interrupted portions in the longitudinal direction of the inner tube.

In some exemplary embodiments, strip-like or spiral shaped fins may be provided on the outer wall of the inner tube for reinforcing heat transfer.

The space between the outlet of the inner tube and the closed end of the outer tube may be designed so that no dead zone and vortex are formed. Dependent on the cracking product and temperature at the outlet of the inner tube, mechanisms for coke-preventing and coke-removing can be provided at the closed end of the outer tube. Mechanisms for coke-preventing and coke-removing may be well known in the art, and thus the detailed description thereof are omitted here.

Compared with the current cracking furnace technologies, the disclosure may have the following advantages:

(1) The disclosure may overcome the mechanical defects of two-pass radiant coils of Type 1-1, Type 2-1, Type 4-1, and of single-pass radiant coils. One of the mechanical defects that may be overcome may include tube bending resulting from the thermal expansion difference between the first pass tube and the second pass tube in two-pass radiant coils. Another mechanical defect that may be overcome may be thermal expansion in connection with a cross-over pipe connecting the outlet tube of the convection section with the inlet manifold of the radiant coil resulting from the single-pass coil expanding only downwardly. According to the radiant coil of the disclosure, the inner and outer tubes may both expand downwardly, and the expanded length of the outer tube may be larger than that of the inner tube. Therefore, it may be unnecessary to arrange springs to absorb the thermal expansion difference between the inner and outer tubes.

(2) Since a two pass flow may be achieved in one vertically arranged radiant coil, the respective process advantages of two-pass radiant coils and single-pass radiant coils may be reserved. Therefore, the cracking furnace of the disclosure may have a run length comparable with two-pass radiant coils and a process property comparable with single-pass radiant coils.

(3) Further, more tubes can be arranged for a certain size of inner space of the furnace firebox, so that the productivity of the cracking furnace may be enhanced.

(4) Still further, there may be no tube bending caused due to the simple mechanical structure of the disclosed radiant coil. Therefore, the lifetime of the radiant coil may be extended.

BRIEF DESCRIPTION OF DRAWINGS

The drawings are illustrative only and not necessarily drawn to scale.

DETAILED DESCRIPTION OF THE INVENTION

It should be noted that the disclosure relates to improvements to a radiant coil in the radiant section of an ethylene cracking furnace. Other structures, such as the convection section and the quench cooler (transfer line exchanger) etc., in an ethylene cracking furnace may already be known in the field, and thus the description thereof is omitted here for the sake of conciseness.

Figure 2:
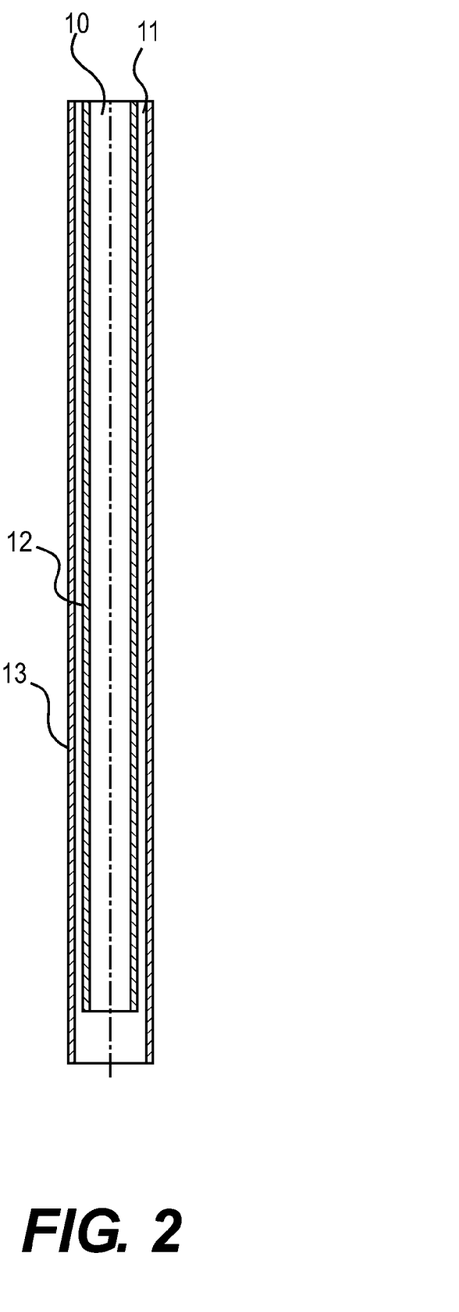
FIG. 2 is a partial longitudinal section view of a double-pass radiant coil according to an exemplary embodiment.

FIG. 2 shows an embodiment of the radiant coil according to the disclosure. As shown in the drawing, a radiant coil 15 may be a double-pass radiant coil. First pass tube (inner tube) 12 of radiant coil 15 may be placed within a second pass tube (outer pass tube) 13, forming a nesting structure. Inner tube 12 may be a tube with both ends open, while outer tube 13 may be open at one end and closed at the other end as shown in FIG. 3.

In operation, a mixture of hydrocarbon and steam may enter inner tube 12 through an inlet 10, and may flow within inner tube 12. After leaving inner tube 12, the mixture may enter into a gap between inner tube 12 and outer pass tube 13, and may finally discharge through an outlet 11.

Figure 3:
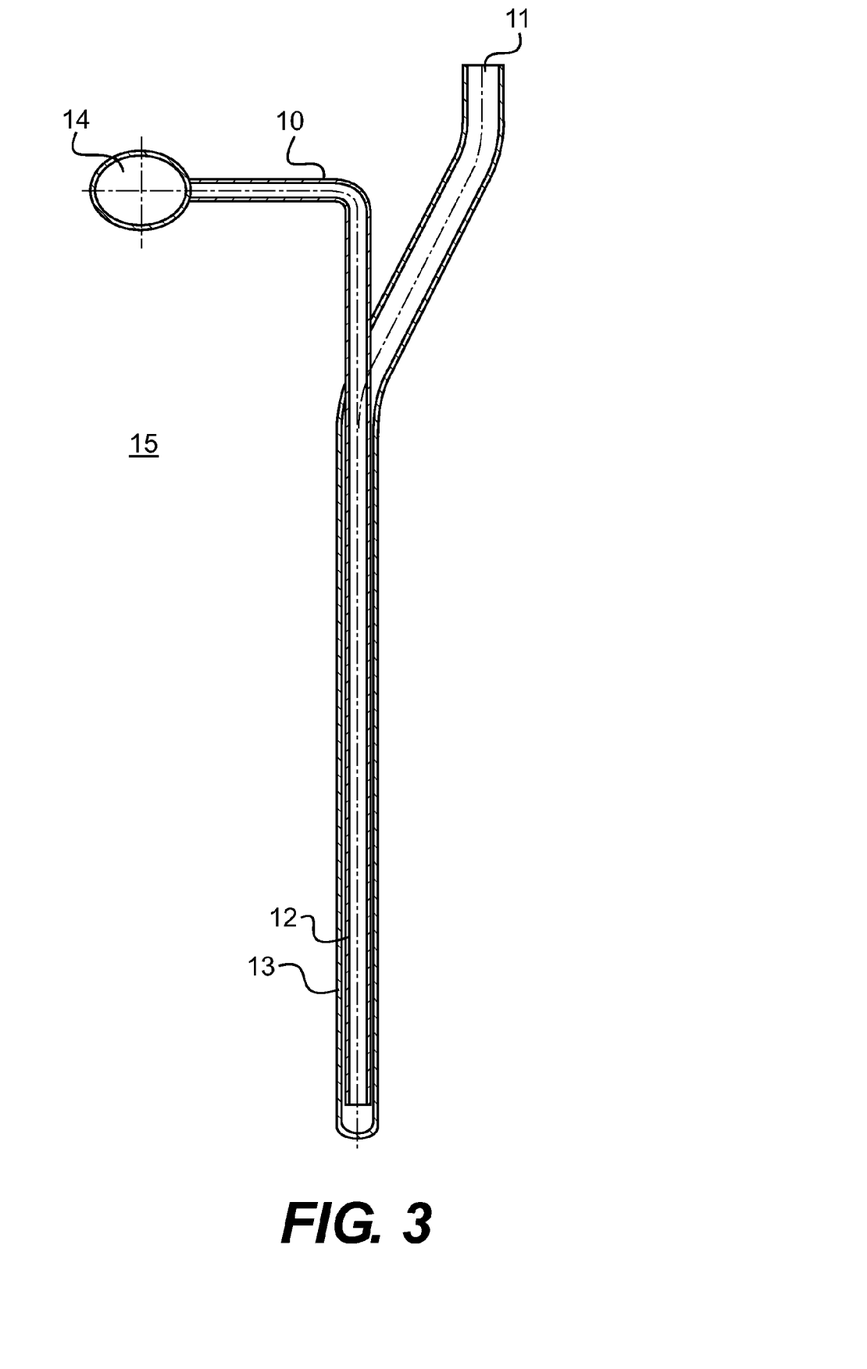
FIG. 3 is a whole longitudinal section view of the double-pass radiant coil of FIG. 2.

FIG. 3 shows the entire structure of radiant coil 15 according to the disclosure. Feedstock may enter inner tube 12 from an inlet manifold 14 via inlet 10, and then may turn over 180 degrees at the closed end of outer tube 13. Then, feedstock may flow into the gap between inner tube 12 and outer tube 13, and may finally discharge from outlet 11.

In this nesting structure, inner tube 12 and outer tube 13 may both expand downwardly when heated, and the expanded length of outer tube 13 may be larger than that of inner tube 12. Therefore, tube bending due to thermal expansion generated in conventional radiant coils can be avoided.

In addition, since inner tube 12 may be nested within outer tube 13, the inner space of the furnace occupied by the radiant coil can be reduced without changing the flow rate of the feedstock. Therefore, more space may be available in the cracking furnace for mounting other radiant coils or other components. In this manner, radiant coil 15 may have a compact structure and the space utilization of the furnace may be enhanced.

While the disclosure is described here with an example of a two-pass radiant coil, it can be also applied to a radiant coil with more than two pass tubes. For example, in a three-pass radiant coil, any two of adjacent pass tubes can be designed as having the nesting structure of the disclosure, while the other pass tube may still have a conventional arrangement. In a four-pass radiant coil, the first two pass tubes can be designed as having the nesting structure of the disclosure, while the last two pass tubes can have the conventional arrangement or the nesting structure of the disclosure.

As shown in FIG. 3, the lower end of the inner tube 12 may be shorter than the closed end of the outer end of outer tube 13 by a certain distance. The distance may be suitably determined to eliminate a dead zone and coking generated at the closed end of the outer end of outer tube 13. The outer end can be closed through various mechanisms. For example, the end of outer tube 13 can be closed by welding a cap or a round steel plate thereon, or by a flange sealing. The closure mechanisms can be suitably selected by one skilled in the art as needed. The closed end of the outer end can be located in the furnace firebox, in a trough arranged in the bottom of the furnace firebox, or be extended from the bottom of the furnace firebox. This may be determined according to the type of closed end and particular requirements. Dependent on the cracking product and temperature at the outlet of the inner tube, mechanisms for coke-preventing and coke-removing can be provided at the closed end of outer tube 13. Mechanisms for coke-preventing and coke-removing may be well known in the art, and thus the detailed description thereof are omitted here.

The ratio of the area of the gap defined between inner tube 12 and outer tube 13 to the area of the inner space of inner tube 12 can be determined from the flow rate of cracking feedstock processed by the cracking furnace through a process calculation. In one or more transverse cross-sections of the radiant coil 15 (see, e.g., transverse cross-sections shown in FIGS. 5 and 9), the ratio of the area of the gap defined between inner tube 12 and outer tube 13 of radiant coil 15 to the area of the inner space of inner tube 12 may be in the range of 1-2:1, 1.0-1.6:1, or 1.0-1.3:1. These ratios may allow for a very good flow condition and process property to be achieved.

Figure 4:
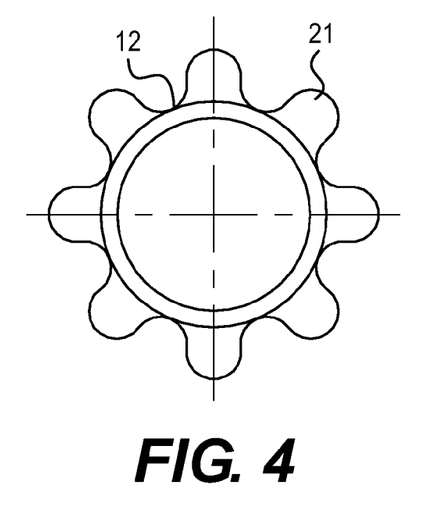
FIG. 4 is a cross-sectional view of an inner tube according to an exemplary embodiment.

FIG. 4 shows fins 21 that are arranged on the whole outer wall of inner tube 12. Each fin 21 may reinforce heat transfer, and can be designed similar to fins disclosed in CN1260469.

Figure 5:
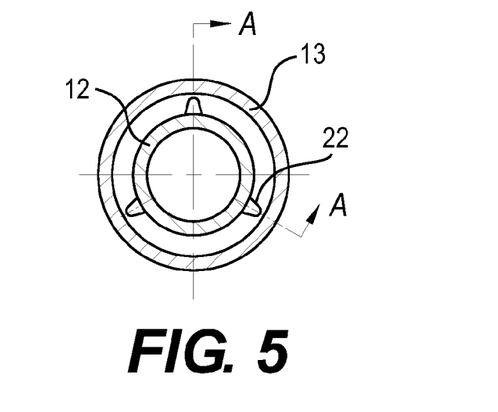
FIG. 5 is a cross-sectional view of a double-pass radiant coil according to an exemplary embodiment.
Figure 6:
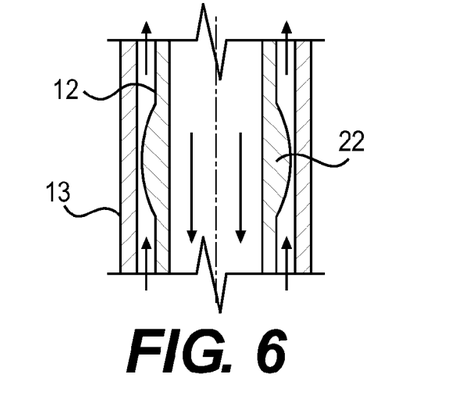
FIG. 6 is a partial longitudinal section view along line segments A-A of FIG. 5.

FIG. 5 is a cross-section view of a radiant coil according to the disclosure. FIG. 6 is a partial section view along line segments A-A of FIG. 5, wherein the flow direction of feedstock is shown by arrows. As shown in FIGS. 5 and 6, positioning elements 22 may be substantially evenly arranged along the outer peripheral surface of inner tube 12, the positioning elements 22 maintaining coaxiality between inner tube 12 and outer tube 13. In the embodiment as shown, there are three positioning elements 22, every two of them being spaced from each other by an angle of 120°. However, it is understood that the quantity of the positioning elements 22 can be optionally selected as needed. Each positioning element 22 may be in the form of a wedge-shaped rib, extending outwardly in the radial direction from the outer peripheral surface of inner tube 12. Each positioning element 22 may have a large width at its root end, and may become gradually narrow toward the radial outer direction. Each positioning element 22 may be rounded at its free end. With position elements 22, an accurate coaxiality can be maintained between inner tube 12 and outer tube 13. Even when thermally expanded, inner tube 12 may not deviate from the central axis of outer tube 13.

Figure 7:
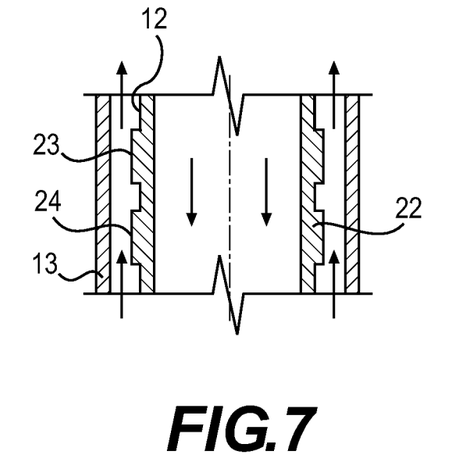
FIG. 7 is a partial longitudinal view, similar to that of FIG. 6, showing an alternative embodiment of fins.
Figure 8:
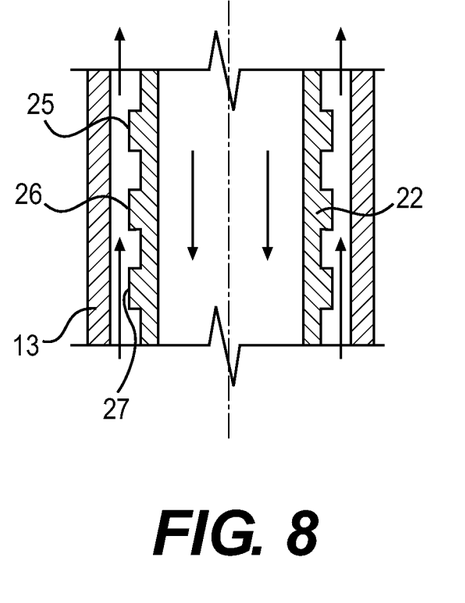
FIG. 8 is a partial longitudinal view, similar to that of FIG. 6, showing another alternative embodiment of fins.

As shown in FIG. 6, each positioning element 22 may extend along at least a part of length of inner tube 12, and may extend in the middle region of the inner tube 12 along its longitudinal direction. Alternatively, each positioning element 22 may be divided into several interrupted portions in a longitudinal direction of inner tube 12. As shown in FIG. 7, in the longitudinal direction of inner tube 12, positioning element 22 may be divided into two portions, i.e. an upper portion 23 and a lower portion 24, or, as shown in FIG. 8, into three portions, i.e., an upper portion 25, a middle portion 26 and a lower portion 27. In this way, a more accurate coaxiality can be achieved between inner tube 12 and outer tube 13, while concurrently reinforcing heat transfer. In the embodiment of FIG. 6, each positioning element 22 may have a drum shape in the longitudinal section. However, it should be noted that each positioning element 22 may alternatively have other shapes in the longitudinal section.

Figure 9:
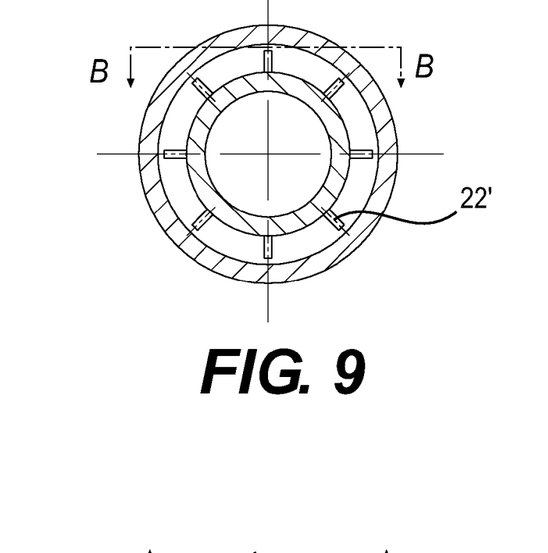
FIG. 9 is a cross-sectional view of a double-pass radiant coil according to another exemplary embodiment.
Figure 10:
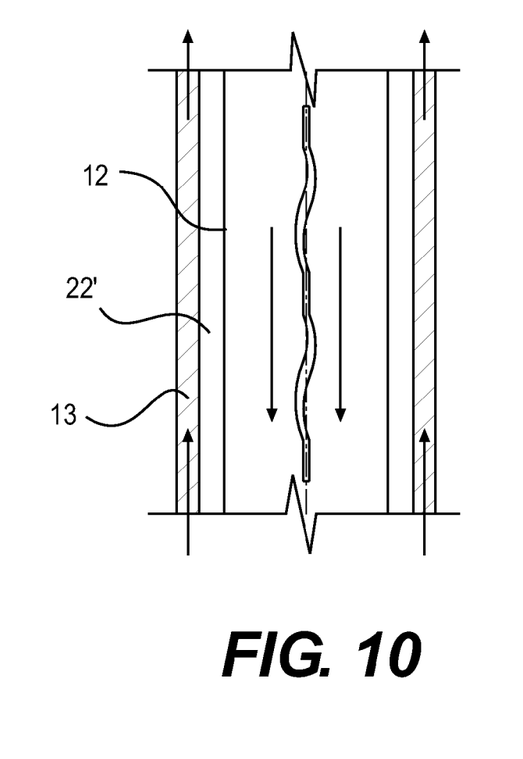
FIG. 10 is a partial longitudinal section view along line B-B of FIG. 7.

For example, FIGS. 9 and 10 show positioning elements 22' according to another exemplary embodiment. FIG. 10 is a partial section view along line B-B of FIG. 9. As shown in FIG. 9, along the outer peripheral surface of inner tube 12, eight positioning elements 22' may be substantially evenly distributed along the outer peripheral surface of inner tube 12. Every two positioning elements 22' may be spaced from each other by an angle of 45°. As shown in FIG. 10, each positioning element 22' may be in the form of curved shape, instead of a linear shape, in the longitudinal direction. The advantages resulting from the arrangement may include turbulence generated when the cracking gas flows in the annular gap, resulting in reinforced heat transfer and reduced coking.

Figure 11:
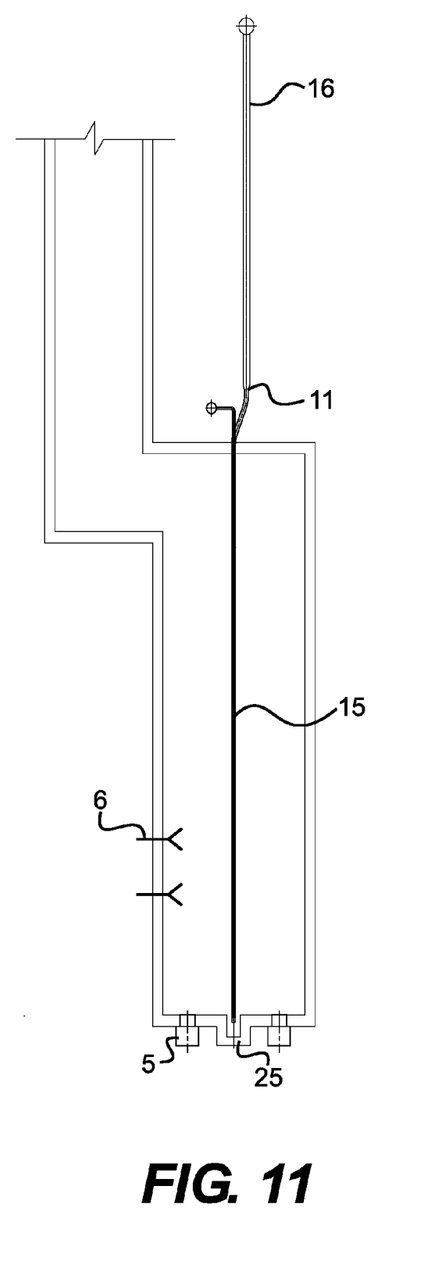
FIG. 11 is a pictorial illustration of an ethylene cracking furnace with a double-pass radiant coil with a linear quench cooler (transfer line exchanger) according to an exemplary embodiment.
Figure 12:
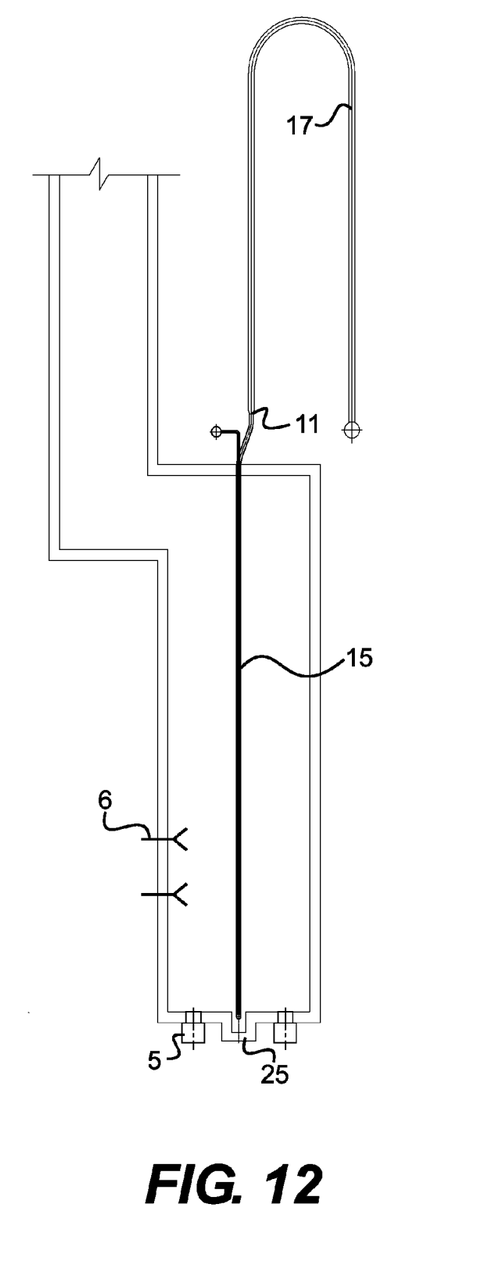
FIG. 12 is a pictorial illustration of an ethylene cracking furnace with a double-pass radiant coil with a U-type quench cooler (transfer line exchanger) according to another exemplary embodiment.

FIGS. 11 and 12 respectively show the connection arrangement of an exemplary double-pass radiant coil 15 with a linear quench cooler 16 and a U-shaped quench cooler 17. As shown in FIG. 11, radiant coil 15 is placed vertically in the center of the radiant section of the cracking furnace. The lower end of radiant coil 15 is received within a trough 25 arranged in the radiant section firebox along the central line thereof. Within trough 25 there may be additional guiders for keeping the tubes from each other by a constant distance. Outlet 11 of radiant coil 15 may communicate with linear quench cooler 16. The convection section may be placed at the left side of the top of the radiant section. Bottom burners 5 may be arranged at both sides of the radiant coil, and fuel may flow into the convection section from the left part of the top of the radiant section after combustion and heat discharge. Additionally, side burners 6 may be placed with respect to the radiant coil for additional firing.

FIG. 12 is similar to FIG. 11, except that outlet 11 of radiant coil 15 may communicate with U-shaped quench cooler 17.

Figure 13:
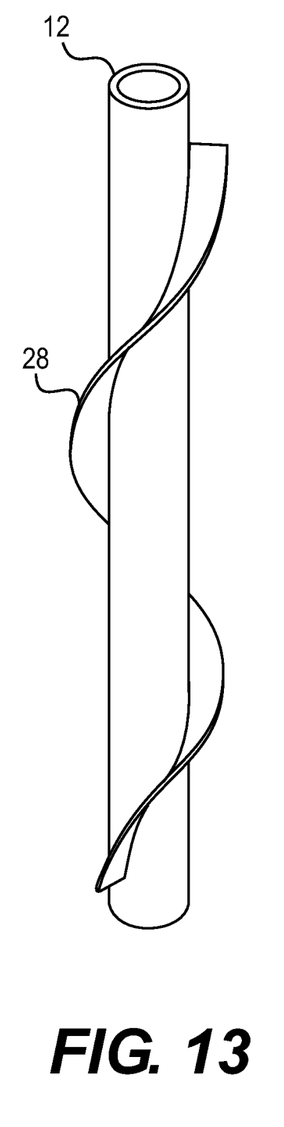
FIG. 13 is an elevated side view illustration of an inner tube with a spiral shaped fin according to an exemplary embodiment.
Figure 14:
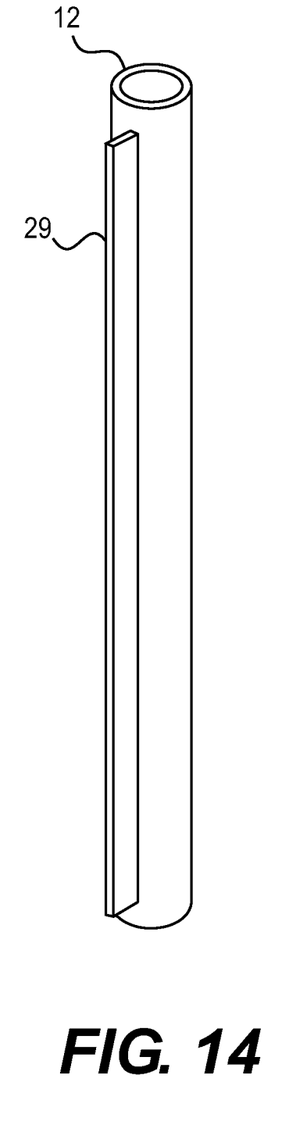
FIG. 14 is an elevated side view illustration of an inner tube with a strip shaped fin according to another exemplary embodiment.

FIG. 13 depicts inner tube 12 according to an exemplary embodiment. In the embodiment of FIG. 13, inner tube 12 may have a spiral shaped fin 28. FIG. 14 is similar to FIG. 13, except that inner tube 12 may have a strip shaped fin 29. While the embodiments of FIGS. 13 and 14 may only be shown with one fin on inner tube 12, it is noted that any number of suitable fins may be placed on inner tube 12.

While the disclosure is described with reference to a set of radiant coils arranged in a cracking furnace, it is understood that more than one set of radiant coils can be arranged in one single cracking furnace. For example, if more than one set of radiant coils are arranged in one cracking furnace, they can be arranged in sequence. A plurality of sets of radiant coils can be arranged along the longitudinal or lateral direction of the furnace firebox.

Although the disclosure is described in detail with reference to some embodiments, it will be apparent to those skilled in the art that modifications and variations may be made to some features/components/structures of the present disclosure without departing from the spirit or scope of the disclosure. In particular, the features disclosed in one embodiment can be combined with those disclosed in other embodiments in various ways unless the combinations may cause conflictions. It is intended that the present disclosure covers all the modifications and variations thereof.

The invention claimed is:

1. An ethylene cracking furnace, comprising: at least one radiant section, the at least one radiant section including bottom burners and/or sidewall burners, and at least one radiant coil arranged in the radiant section; wherein the radiant coil includes at least an upstream pass tube and a downstream pass tube, the upstream pass tube being configured as an inner tube, and the downstream pass tube being configured as an outer tube surrounding the inner tube and having a closed end, wherein the inner tube defines an inner space forming an upstream flow path, wherein a gap is defined between the inner tube and the outer tube, the gap forming a downstream flow path, wherein positioning elements are arranged on an outer peripheral surface of the inner tube, the positioning elements maintaining coaxiality between the inner tube and the outer tube, wherein at least one of the positioning elements has a curved shape in a longitudinal direction of the inner tube, wherein the positioning elements are wedge-shaped ribs extending away from the outer peripheral surface of the inner tube, the wedge-shaped ribs extending outwardly and narrowing along respective radial directions, wherein each of the wedge-shaped ribs has a large width at its root end, gradually narrowing toward the radial outer direction, and is rounded at its free end, and wherein each of the wedge-shaped ribs has a parabolic shape in a radial cross-section view, wherein the ethylene cracking furnace further comprises at least one spiral-shaped fin, and wherein the wedge-shaped ribs extend from the at least one spiral-shaped fin, and the wedge-shaped ribs are in the form of a curved shape in the longitudinal direction.

2. The ethylene cracking furnace according to claim 1, wherein in at least one transverse cross-section of the radiant coil, a ratio of an area of the gap defined between the inner tube and the outer tube to an area of the inner space of the inner tube is in a range of 1:1 to 2:1.

3. The ethylene cracking furnace according to claim 1, wherein in at least one transverse cross-section of the radiant coil, a ratio of an area of the gap defined between the inner tube and the outer tube to an area of the inner space of the inner tube is in a range of 1:1 to 1.6:1.

4. The ethylene cracking furnace according to claim 1, wherein in at least one transverse cross-section of the radiant coil, a ratio of an area of the gap defined between the inner tube and the outer tube to an area of the inner space of the inner tube is in a range of 1:1 to 1.3:1.

5. The ethylene cracking furnace according to claim 1, wherein at least one of the positioning elements is divided into several interrupted portions in a longitudinal direction of the inner tube.

6. The ethylene cracking furnace according to claim 1, wherein at least one of the positioning elements has a cylindrical body with a side wall deformed radially outward.

7. The ethylene cracking furnace according to claim 1, wherein the inner tube is shorter than the outer tube.

8. The ethylene cracking furnace according to claim 1, wherein the at least one spiral-shaped fin is provided on an outer wall of the inner tube, the fin facilitating heat transfer.

9. The ethylene cracking furnace according to claim 1, wherein the radiant coil is a double-pass tube, the inner tube forming a first pass tube and the gap between the inner tube and the outer tube forming a second pass tube.

* * * * *

UNITED STATES PATENT AND TRADEMARK OFFICE
CERTIFICATE OF CORRECTION

PATENT NO. : 9,833,762 B2  
APPLICATION NO. : 13/271497  
DATED : December 5, 2017  
INVENTOR(S) : He et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this
Twenty-fifth Day of September, 2018

Andrei Iancu
*Director of the United States Patent and Trademark Office*